United States Patent [19]
Axelrod

[11] Patent Number: 6,093,427
[45] Date of Patent: *Jul. 25, 2000

[54] VEGETABLE-BASED DOG CHEW

[75] Inventor: Glen S. Axelrod, Mahwah, N.J.

[73] Assignee: T.F.H.Publications, Inc., Neptune City, N.J.

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/923,070

[22] Filed: Sep. 3, 1997

[51] Int. Cl.[7] ........................................ A23K 1/00
[52] U.S. Cl. .......................... 426/104; 426/623; 426/635; 426/805
[58] Field of Search ..................... 426/623, 635, 426/805, 104

[56] References Cited

U.S. PATENT DOCUMENTS

| | | | |
|---|---|---|---|
| 3,821,446 | 6/1974 | Estey et al. | 426/373 |
| 3,899,607 | 8/1975 | Miller et al. | 426/285 |
| 4,032,665 | 6/1977 | Miller et al. | 426/104 |
| 4,171,383 | 10/1979 | Chwalek et al. | 426/623 |
| 4,310,558 | 1/1982 | Nahm, Jr. | 426/98 |
| 4,315,034 | 2/1982 | Levinson et al. | 426/104 |
| 4,735,808 | 4/1988 | Scaglione et al. | 426/62 |
| 4,784,860 | 11/1988 | Christensen et al. | 426/46 |
| 4,800,099 | 1/1989 | Gellman et al. | 426/641 |
| 4,886,440 | 12/1989 | Forrest et al. | 425/208 |
| 4,892,748 | 1/1990 | Andersen et al. | 426/635 |
| 5,200,212 | 4/1993 | Axelrod | 426/2 |
| 5,296,209 | 3/1994 | Simone et al. | 424/49 |
| 5,419,283 | 5/1995 | Leo | 119/709 |
| 5,476,069 | 12/1995 | Axelrod | 119/709 |

FOREIGN PATENT DOCUMENTS

| | | |
|---|---|---|
| 337573 | 10/1989 | European Pat. Off. . |
| 2705864 | 6/1993 | France . |
| 3701861 | 8/1988 | Germany . |
| 195 01 142 | 7/1995 | Germany . |

*Primary Examiner*—Chhaya D. Sayala
*Attorney, Agent, or Firm*—Hayes, Soloway, Hennessey, Grossman & Hage, P.C.

[57] ABSTRACT

A chew toy having a substantial component of vegetable matter wherein such vegetable matter, in dried and powdered or granulation form, is melted as it is injection molded. The process provides a chew toy with a consistency and chewability preferred by most dogs that is not attainable by known prior art baking or compression molding techniques.

24 Claims, No Drawings

VEGETABLE-BASED DOG CHEW

BACKGROUND OF THE INVENTION

1. Field of the Invention

The present invention relates generally to dog chews, and more particularly, pertains to a nutritional dog chew based upon vegetable matter.

2. Description of Related Art

Most dogs enjoy chewing on various items, and many are especially attracted to animal bones and animal-derived chew toys. However, bones and many animal-derived chew toys can pose a hazard to a dog in that any splinters or large pieces that are swallowed may become impaled or may otherwise obstruct the digestive tract. Moreover, the nutritional content of some of the processed dog chews, may not correspond to a particular dog's requirements. While various vegetable derived products are available to address such nutritional concerns, the chewability of such products does not conform to the chew characteristics desired in dog chews. The material is either not hard enough to serve as a dog chew or is extremely hard and dense to the point it is brittle and is therefore quickly and easily shattered by a large dog.

It is therefore desirable to provide a dog chew that has the chewing characteristics normally associated with chew toys, but providing a nutritional bone not found in indigestible plastic dog chews and in traditional meat/chicken-based dog chews.

SUMMARY OF THE INVENTION

The present invention provides a dog chew with a substantial component of filamentateous vegetable matter that overcomes the above-described disadvantages associated with prior art dog chews. The dog chew of the present invention has a consistency preferred by most dogs, and if shattered or splintered will tend to be digested and not cause intestinal blockage. Moreover, such dog chew is easily digestible, supplies nutrients to the dog and is composed completely of natural ingredients.

These advantageous characteristics are achieved by first comminuting filamentateous vegetable matter to small particles, bringing the comminuted particles to a desired moisture content, adding casein and gelatin, and then injecting the mixture in a liquefied state at a raised pressure into an injection mold. The molded form is then allowed to cool in the injection mold until it hardens.

In the course of subjecting the comminuted matter to melting temperatures, the material becomes sterilized. Such sterilization serves to interrupt any decaying process that may be in progress, and thereby alleviates the potential for the dog chew to emit a foul odor. Furthermore, sterilization is achieved without baking the molded material so as to yield a very chewable product with a consistency and texture preferred by most dogs. By molding the vegetable-based mixture under a raised pressure, a substantially more cohesive product is formed than is possible using a baking process.

These and other features and advantages of the present invention will become apparent from the following detailed description of a preferred embodiment.

DETAILED DESCRIPTION OF A PREFERRED EMBODIMENT

The vegetable-based dog chew of the present invention may be prepared as follows:

Dried vegetable-based matter is comminuted into small particles not exceeding 0.25–0.50" across their largest dimension. Up to about 31% by weight of casein, up to about 30% by weight of water and preferably up to about 4% by weight of gelatin may then be added to the vegetable particle mixture to facilitate molding and to adjust the chewability of the ultimate product. Various attractants such as chicken or liver and/or certain nutrients such as vitamins may additionally be added to the particle mixture. The vegetable matter includes up to about 4% by weight of ash.

The particle mixture is then injected into a conventional injection molding machine having a barrel temperature of about 250–400° F. and a molding pressure of about 1000–2500 psi. The heat serves to sterilize the mixture while the commensurate liquefication of the particle mixture ensures that a relatively homogeneous mixture of filamentateous vegetable matter, casein, gelatin if utilized, and any additives results. Homogeneity is most desirable as clumps of high concentrations of certain vitamins for example could be deleterious to the dog's health.

After the particle mixture in the mold has been molded, it is cooled sufficiently to cause the molded form to re-solidify into a desired shape, such as a bone, to thereby allow it to be ejected or extracted from the mold. Finally, the product is allowed to dry in a drying room over the course of about a week, while its moisture content is adjusted to about 13–14% by weight. It is not necessary to package the dog chew made in accordance with my present invention in moisture-proof packaging.

It has been found that dogs find the resulting dog chew especially attractive, presumably by virtue of its chewability and consistency. As the dog chews on the product, small slivers thereof become dislodged at which point the dog gains the benefit of any of the nutritional components contained therein. The consistency of the resulting dog chew is such that it takes most dogs about 30 minutes to a day to consume depending upon the particular dog, thereby providing a cost savings to the dog owner as compared to typical soft or small dog treats.

Chewing the hard molded dog chew made in accordance with the present invention serves to massage a dog's teeth and gums thereby inhibiting the formation of plaque. Additionally, because a dog satisfies its craving for food by chewing such dog chew, obesity in the dog is also inhibited.

Various filamentateous vegetables may be utilized to prepare the dog chew of the present invention. Spinach has proven to be particularly effective. Other vegetables, such as asparagus, broccoli, beans or peas may also prove desirable.

While a particular form of the invention has been illustrated and described, it will also be apparent to those skilled in the art that various modifications can be made without departing from the spirit and scope of the invention as set forth by the appended claims.

What is claimed is:

1. A dog chew consisting essentially of injection molded filamentateous vegetable matter, casein, and water.

2. A dog chew consisting essentially of injection molded filamentateous vegetable matter, casein, water and an attractant.

3. The dog chew of claim 1, wherein said vegetable matter is no larger than 0.25–0.50" across it largest dimension, wherein said casein is present up to 31% by weight.

4. The dog chew of claim 1 having the form of a bone.

5. The dog chew of claim 1 wherein said vegetable matter is selected from the group consisting of spinach, asparagus, broccoli, beans, peas and mixtures thereof.

6. A method of forming a dog chew comprising the steps in sequence of:

(A) drying filamentateous vegetable matter;

(B) reducing said dried vegetable matter to particles;

(C) forming a mixture consisting essentially of the vegetables particles, casein and water;

(D) melting the resulting mixture from step (C);

(E) injection molding the melted mixture from step (D) in a mold having a desired shape for said dog chew;

(F) removing the shaped dog chew from the mold; and (G) allowing said shaped dog chew to harden.

7. The method of claim 6 wherein said vegetable matter is reduced in size no larger than 0.25–0.50" in any dimension.

8. The method of claim 5, wherein said casein is added at up to approximately 31% by weight, and the molding takes place at about 250–400° F. and at a pressure of about 1000–2500 psi.

9. The method of claim 6, wherein the moisture content of said vegetable matter is up to about 30% by weight prior to molding.

10. The method of claim 6 wherein said molding is in the form of a bone.

11. The method of claim 6 wherein said vegetable matter is selected from the group consisting of spinach, asparagus, broccoli, beans, peas and mixtures thereof.

12. A dog chew consisting essentially of injection molded spinach matter, casein, and water.

13. The dog chew of claim 12, wherein said spinach matter is no larger than 0.25–0.50" across its largest dimension, wherein said casein is present up to 31% by weight.

14. The dog chew of claim 12 further comprising nutrients.

15. A dog chew consisting essentially of injection molded spinach matter, casein, water and an attractant.

16. A method of forming a dog chew comprising the steps in sequence of:

(A) drying spinach matter;

(B) reducing said spinach matter to particles;

(C) forming a mixture consisting essentially of said spinach matter, casein and water;

(D) melting the resulting mixture from step (C);

(E) injection molding the melted mixture from step (D) in a mold having a desired shape for said dog chew;

(F) removing the shaped dog chew from the mold; and (G) allowing said shaped dog chew to harden.

17. The method of claim 16, wherein said spinach matter is reduced in size no larger than 0.25–0.50" in any dimension.

18. The method of claim 16, wherein said casein is added at up to approximately 31% by weight, and the molding takes place at about 250–400° F. and at a pressure of about 1000–2500 psi.

19. The method of claim 16, wherein the moisture content of said spinach matter is up to about 30% by weight prior to molding.

20. The method of claim 16, wherein said molding is in the form of a bone.

21. A dog chew consisting of injection molded filamentateous vegetable matter, casein, and water.

22. The dog chew of claim 21, wherein said vegetable matter is selected from the group consisting of spinach, asparagus, broccoli, beans, peas, and mixtures thereof.

23. A method of forming a dog chew consisting of the following steps:

(A) drying filamentateous vegetable matter;

(B) reducing said dried vegetable matter to particles;

(C) adding casein and water to the vegetable particles matter to form a mixture;

(D) melting the resulting mixture from step (C);

(E) injection molding the melted mixture from step (D) in a mold having a desired shape for said dog chew;

(F) removing the shaped dog chew from the mold; and (G) allowing said shaped dog chew to harden.

24. A method of forming a dog chew comprising the steps in sequence of:

(A) drying filamentateous vegetable matter;

(B) reducing said dried vegetable matter to particles;

(C) forming a mixture consisting essentially of the vegetable particles, casein, an attractant and water;

(D) melting the resulting mixture from step (C);

(E) injection molding the melted mixture from step (D) in a mold having a desired shape for said dog chew;

(F) removing the shaped dog chew from the mold; and (G) allowing said shaped dog chew to harden.

* * * * *